(12) United States Patent
Herickhoff

(10) Patent No.: US 9,550,905 B2
(45) Date of Patent: Jan. 24, 2017

(54) CONTROLLED CONVERSION OF MINERALS TO PIGMENTING ELEMENTS SYSTEMS AND METHODS

(71) Applicant: American Talc Company, Casper, WY (US)

(72) Inventor: James A. Herickhoff, Fort Collins, CO (US)

(73) Assignee: American Talc Company, Casper, WY (US)

( * ) Notice: Subject to any disclaimer, the term of this patent is extended or adjusted under 35 U.S.C. 154(b) by 0 days.

(21) Appl. No.: 15/158,292

(22) Filed: May 18, 2016

(65) Prior Publication Data

US 2016/0340536 A1  Nov. 24, 2016

Related U.S. Application Data

(63) Continuation of application No. 14/259,137, filed on Apr. 22, 2014, now Pat. No. 9,371,237.

(60) Provisional application No. 61/854,396, filed on Apr. 22, 2013.

(51) Int. Cl.
| | | |
|---|---|---|
| *C09D 17/00* | (2006.01) | |
| *C09C 1/02* | (2006.01) | |
| *C01B 33/22* | (2006.01) | |

(52) U.S. Cl.
CPC ............ *C09D 17/008* (2013.01); *C01B 33/22* (2013.01); *C09C 1/028* (2013.01); *C01P 2006/12* (2013.01); *C01P 2006/62* (2013.01); *C01P 2006/63* (2013.01); *C01P 2006/64* (2013.01); *C01P 2006/80* (2013.01)

(58) Field of Classification Search
None
See application file for complete search history.

(56) References Cited

U.S. PATENT DOCUMENTS

| | | |
|---|---|---|
| 3,309,214 A | 3/1967 | Podschus et al. |
| 3,366,501 A | 1/1968 | Lamar |
| 3,544,093 A | 12/1970 | Collins |
| 3,834,860 A | 9/1974 | Fukuda |
| 4,039,277 A | 8/1977 | Kobayashi |
| 4,197,084 A | 4/1980 | Mullner |
| 4,260,370 A | 4/1981 | Goldman |
| 4,276,020 A | 6/1981 | Shibuya |

(Continued)

FOREIGN PATENT DOCUMENTS

| | | |
|---|---|---|
| FR | 2575170 A1 | 6/1986 |
| FR | 2585691 A1 | 2/1987 |

(Continued)

OTHER PUBLICATIONS

Aitken, John and Roman, Shaun D.; Antioxidant Systems and Oxidative Stress in the Testes; Molecular Mechanisms in Spermatogenesis; Chapter 9; pp. 154-171; 2008 Copyright Landes Bioscience.

(Continued)

*Primary Examiner* — Melissa Swain
(74) *Attorney, Agent, or Firm* — Santangelo Law Offices, P.C.

(57) ABSTRACT

The present invention may provide talc calciner systems and methods to produce better and more efficient products by engineering a* and b* values for calcinated products perhaps by processing low iron talc in an indirectly heated, multiple zoned calciner which may progressively heat the feed supply at perhaps specifics residence times to produce a desired product.

20 Claims, 2 Drawing Sheets

(56) References Cited

U.S. PATENT DOCUMENTS

| | | |
|---|---|---|
| 4,390,449 A | 6/1983 | Peters et al. |
| 4,678,517 A | 7/1987 | Dunaway |
| 4,814,019 A | 3/1989 | Weber |
| 4,927,874 A | 5/1990 | Weber |
| 5,154,766 A | 10/1992 | Young |
| 5,229,094 A | 7/1993 | Clauss et al. |
| 5,371,051 A | 12/1994 | Pope et al. |
| 5,376,605 A | 12/1994 | Innicelli et al. |
| 5,810,998 A | 9/1998 | Arrington-Webb et al. |
| 5,830,818 A | 11/1998 | Bruns et al. |
| 5,891,236 A | 4/1999 | Kogel et al. |
| 6,006,920 A | 12/1999 | Billmoria et al. |
| 6,048,490 A | 4/2000 | Cornelius et al. |
| 6,186,355 B1 | 2/2001 | Luedecke |
| 6,514,333 B1 | 2/2003 | Yuan et al. |
| 8,142,856 B2 | 3/2012 | Chevalier |
| 8,298,677 B2 | 10/2012 | Wiesner et al. |
| 8,349,939 B2 | 1/2013 | Buri et al. |

FOREIGN PATENT DOCUMENTS

| | | |
|---|---|---|
| FR | 2674515 A1 | 10/1992 |
| WO | 2006016036 | 2/2006 |

OTHER PUBLICATIONS

Brett, N.H., Mackenzie, K.J.D., and Sharp, J. H.; The Thermal Decomposition of Hydrous Layer Silicates and their Related Hydroxides; Department of Ceramics with Refractories Technology, University of Sheffield; pp. 185-207; Published Jan. 1, 2970.

U.S. Appl. No. 61/854,396, filed Apr. 22, 2013; first named inventor: James A. Herickhoff.

U.S. Appl. No. 14/259,137, filed Apr. 22, 2014; first named Inventor: James A. Herickhoff.

U.S. Appl. No. 14/259,137, filed Apr. 22, 2014; first named Inventor: James A. Herickhoff; Notice of Allowance dated May 11, 2016. 8 pages.

CONTROLLED CONVERSION OF MINERALS TO PIGMENTING ELEMENTS SYSTEMS AND METHODS

PRIORITY CLAIM

This application is a continuation of U.S. patent application Ser. No. 14/259,137, filed Apr. 22, 2014, which claims priority to, and the benefit of U.S. Patent App. No. 61/854,396 filed Apr. 22, 2013, each application is hereby incorporated by reference herein in their entirety.

BACKGROUND

The present invention relates to the field of calcining of minerals such as talc, kaolin, and the like. In particular it relates to processes, substances, and apparatus that can enhance and achieve production of a product in a manner that achieves enhanced results for the product and the end uses of the product, such as predictably and repeatable generating a specific L*a*b* value or perhaps otherwise afford technical or economic advantages.

Numerous industries which produce plastics of various types, paints for multiple uses, elastomerics for roof and other coatings, paper, caulking and other products use minerals which serve as fillers, extenders and opacifiers, and which perform functions with the base materials which cannot occur without such fillers, extenders or opacifiers.

One such mineral is talc. Talc is commonly called hydrous magnesium silicate or magnesium silicate hydroxide, with the chemical formula $Mg_3(Si_4O_{10})(OH)_2$. Silicon oxide tetrahedra are composed of three oxygen molecules which form the base of tetrahedron located at the surface of a sheet. The fourth oxygen molecule in the lower plane forms the opposing apex, with a silicon being located within the tetrahedron. These internal sheets are bonded together by Van Der Waals forces. Some tetrahedra are reversed and have an active apex located at the surface of the sheet, this apex consisting of a hydroxyl group (OH) bonded to the silicon of the tetrahedron to form a silanol group SiOH. The surface sheets are connected together to the same internal sheets by Van Der Waals forces.

Upon heating, perhaps beginning at approximately 100° C., talc (here commonly termed a "feed") may undergo a series of significant changes in the chemical nature and crystalline structure. At about 100° C., free moisture may be evolved from talc. Then, as further heating occurs, various organic compounds may be released and the carbonate impurities associated with talc may be driven off perhaps beginning at about 550° C. Additional heating may cause the crystalline water to evolve at about 950° C. Heating beyond 1000° C. (commonly called hard calcination) may be practiced to ensure conversion of the talc material to secondary, distinct materials, commonly referred to as "products" such as enstatite ($MgSiO_2$), protoenstatite ($MgSiO_2$), clinoenstatite ($MgSiO_3$), or the like. In the presence of some impurity materials, diopside ($CaMg(SiO_3)_2$) may be formed. Such impure materials may cause formation of products such as diopside, dolomite (calcium magnesium carbonate), chlorite (hydrated magnesium aluminum silicate), limestone (calcium carbonate), or the like.

Calcining of talc has been regarded as a simple process, but discoveries disclosed herein have shown how new and remarkable results and products may be achieved, including but not limited to, use of low value talc that can be transformed into a higher value material. Past technologies have formed ceramic pigments from talc and have created hydrophyllic substances. Past talc calcinations patents may have generally focused on reaching a single temperature within a calciner, and other temperature measurements are taken as resultant of the firing temperature. Other past technologies have used direct-fired calcination in rotary kilns, which may feature a flame at the discharge end, with the hot combustion gases moving toward the feed end, taking with it high volumes of feed powder, or if pelletized, taking the abraded powder off the pellets and moving it to bag houses or other methods of dust capture. The discovery disclosed in embodiments of the present invention include the effect of the speed of gas evolution in the first heating stages, the removal of said gases, and perhaps even the impact on morphology of the final product. Past technologies have shown the use of calcining temperatures from about 900° C. to about 1275° C. and may have also shown the formation of enstatite and clinoenstatite when calcining. The formation of those products is not the subject of this invention, but the methods to achieve various quality parameters in the final product is a key subject. It is no longer necessary to accept blindly whatever product comes out of the calciner—the products can be engineered, perhaps beginning at the feed end.

The key quality parameters sought by firms now calcining talc, in addition to retaining the lamellarity (platyness) of talc, are the L*a*b* values, hue, chromaticity, the surface area, specific gravity, and refractive index of the pigments produced by calcinations.

The thermal conversion of feed such as talc to products such as enstatite (between about 1100° C. to about 1220° C.) may provide products which are no longer talc, and may or may not have properties of talc. For example, talc is hydrophobic, while enstatite is hydrophyllic. Depending on the conditions under which the transformation occurs, product softness or hardness, platy morphology, density, refractive and other properties may be impacted. Chemically, in addition to the above, inert siloxane bridges may be replaced by active hydrophyllic groups. X-ray diffraction patterns may demonstrate that the former talc substance is no longer talc.

Talc has for many years been used in the production of various ceramics, and researchers have found that heating (e.g., calcining) to temperatures in the about 1200° C. range changes the soft, platy crystals to ceramic, elongated crystals that can be sharp edged and having Mohs hardness in the 5 to 7 range.

The products developed using embodiments of the present invention have many uses, including but not limited to, a partial substitution for the use of titanium dioxide in paints, plastics, elastomers, caulks and sealants, and other products. The ceramic pigments (e.g., enstatite, clino-enstatite, or the like) produced may also be used for specialty high temperature greases and lubricants, as well as exotic ceramics such as is found in space shuttle tiles or in the proppants used in hydraulic fracturing of horizontal gas and oil wells. This may be a desirable partial substitution because talc feed and its products may be more cost effective to utilize than the current or existing technology.

In the past, calcining may involves heating a tube or igniting natural gas, propane, fuel oil, or other hydrocarbon materials. The mineral to be calcined, such as talc, may be fed into the heated tube. In the past, the tube generally consisted of one heat zone, but may have a slightly cooler heat zone at the feed end due to the heat exchange which is occurring between the cold feed, the environment, and the calcining tube. Gasses which are given off during the chemical conversion of feed to products have been pulled off with combustion gasses in such a manner as to maintain the proper heat in the tube. Feed into the calciner can be milled, or may be of larger generally uniform size. Moreover product can also be milled when required, but clearly the cost of milling soft feed talc is significantly less than much harder ceramic product.

Commercial use of talc and its calcined products are limited by the color, as assessed by the CIE L*a*b* scale, the size and size distribution, and other mineral specific properties. For example, if adequate brightness (L* value of perhaps 98) is not obtained, the product materials may not be utilized in paints. If perhaps the a* value, which measures red/green color is >about 0.3 or generally considered 'red' the secondary product materials may not be utilized in caulks. If perhaps the b* value, which measures blue/yellow is >about 2.8 or generally considered too yellow, the secondary materials may be undesirable for use in plastics.

Therefore, commercial use of raw talc is often limited by the L*, a* and/or b* values. For example talc naturally occurs in multiple colors such as grey, black, green, pink and white. Black or grey talc can, upon calcining, become white, in the range from L*=about 93 or higher, depending on calcining conditions. This may or may not be sufficiently bright to be utilized in paint. Thus, even if it may be less expensive to use than titanium dioxide, it may likely not be available to serve as a substitute.

Past technologies may include U.S. Pat. No. 3,366,501 by Lamar, U.S. Pat. No. 5,229,094 by Clauss, FR Pat. No. 2,585,691 by Ducasse, U.S. Pat. No. 5,154,766 by Young, U.S. Pat. No. 5,371,051 by Pope, and U.S. Pat. No. 3,309,214 by Podschus, each incorporated by reference herein in its entirety.

U.S. Pat. No. 3,366,501 by Lamar may provide a method of producing a white ceramic enstatite pigment from talc, which may be hydrophilic and can be used for paper and paint manufacturing. The L*a*b* values are not mentioned or discussed. Lamar may utilize a direct-fired calciner and the product may milled to a particle size d50 of 6 microns or larger to produce a saleable powder.

U.S. Pat. No. 5,229,094 by Clauss may describe talc undergoing chemical or thermal transformation wherein the talc particles may be heated to a temp below 900° C. perhaps under conditions to avoid conversion of talc to enstatite.

Patent FR 2,585,691 A1 by Ducasse may describe a method of preparing a fine lamellar calcined talc powder perhaps in a direct-fired rotary kiln from a talc feed first milled to d50 of 10 microns and then milled again to d50 of 3.5 microns.

U.S. Pat. No. 5,154,766 by Young may provide raw kaolin that may be slurried with the addition of some magnetite, flocculated with aluminum and sulfuric acid, perhaps even run through a filter press to produce a cake which was dried. However, the product of the Young patent may not be acceptable as a talc-enstatite product and therefore cannot be considered useful.

U.S. Pat. No. 5,371,051 by Pope et. al. may attempt to increase the opacity of calcined kaolin pigments perhaps by the addition or retention of small percentages of titanium dioxide. This method may not be practical due to the additional cost of titanium dioxide.

U.S. Pat. No. 3,309,214 by Podschus may provide double calcinations of kaolin, first in a shock calciner at 400° C. to 500° C. for one second whereby the turbulent hot gas stream may partially change the crystal structure, and then in a second calciner of varying types for about one hour at about 800° C. to 1100° C. This process may have achieved some improvement over competitive kaolin processes but the improvement does not translate to talc processing. The vertical turbulent shock calciner may not provide sufficient residence time to be beneficial to color, or to completely calcine talc to enstatite.

In the past, controlling the production of the L*a*b* values has not been commercially feasible because calcination and the end products may appear to be a somewhat random event, perhaps resulting in unpredictable products which may have unpredictable L*a*b* values. Moreover, mineral qualities such as platyness (or lamellarity), opacity, softness, strength, or the like may affect the commercial value and may also be considered somewhat uncontrolled as secondary products are produced via calcination of minerals. By contrast, embodiments of the present invention addresses and demonstrates the beneficial impact of controlling the calcination process and systems.

SUMMARY OF THE INVENTION

Colored talcs and secondary products produced from calcination are salable in narrow market niches today, but with the processes and methods as described in the various embodiments of the present invention, minerals and even low value talcs may be transformed into high value products for the talc producer, and perhaps at the same time, provide cost effective pigments and opacifiers for paint, plastics, sealer, and perhaps many other markets. Embodiments of the present invention may define a method for retaining the beneficial platyness of many talcs, while providing the benefit of opacity, high brightness, softness, and strength as well as controlling the final L*a*b* values.

Therefore, an object of the present invention may include enhancing the whiteness characteristics of the mineral process-feed in a manner which might produce consistent and repeatable color values in the product as assessed by a CIE L*a*b* value, and may even provide manipulation of the variables in the process, such as a manipulation of the color values to those desirable for a particular end use.

Another object of the present invention may include the combination of low-iron talc feed with progressively higher temperatures in a calcining tube of a calcinator, perhaps with specific inorganic metal oxides which may engineer varying a* and b* values and may create a desired platy ceramic pigment at very high L* values.

Another object of the present invention may include changing the opacity of the clear talc crystals to an opaque crystal with varying degrees of opacity, depending on the process parameters.

Another object of the present invention may include defining the process parameters, perhaps from mineral feed input temperatures to calciner residence, maximum temperatures, and even residence time, or the like.

Yet another object of the present invention may include defining the method by which color parameters of secondary products, including but not limited to enstatite products, or the like, may be manipulated consistently and on a production basis.

Another object of the present invention may include defining the mineral ore types which can most successfully be converted to desirable secondary products, such as enstatite or the like.

Another object of the present invention may include defining the impact of metals and metal alloys which comprise the calciner tube of the rotating calciner.

Yet another object of the present invention may include defining the parameters of handling of the evolved process gases so as to prevent deleterious impacts to the final product.

Another object of the present invention may include providing an economical talc calcination system that avoids use of titanium dioxide.

Yet another object of the present invention may include providing a talc calcination system utilizing methods and apparatus that provide a better product over past systems.

Other objects of the present invention can be found in the specification, figures, and claims of this application.

DETAILED DESCRIPTION OF THE PREFERRED EMBODIMENTS

Figure 1:
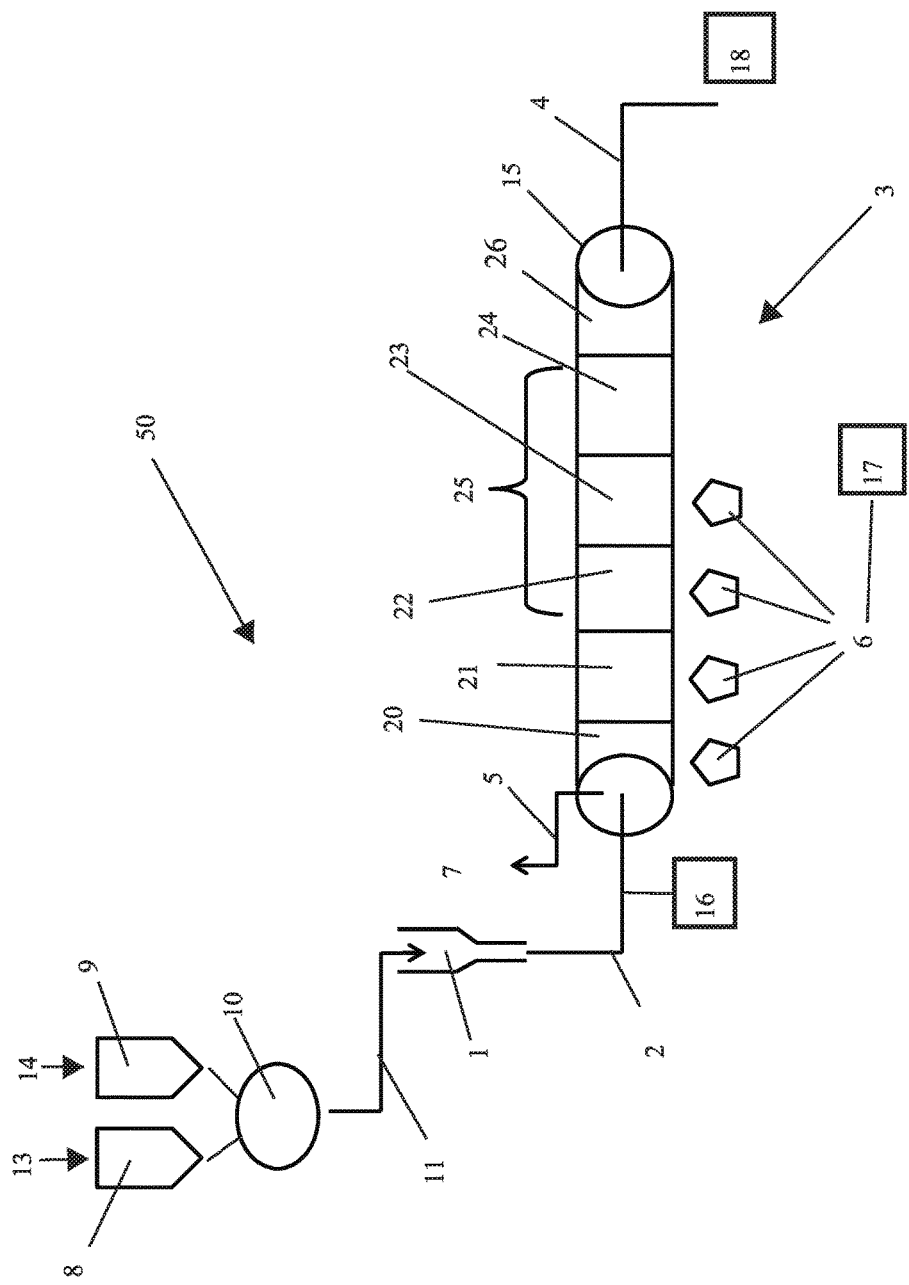
FIG. 1 represents a general schematic of a talc calcination system according to the various embodiments of the present invention.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application In general, the present invention may include systems and methods for calcination of minerals including creation of desired end products to be utilized in unique applications. In embodiments, various techniques for utilizing minerals from various sources may easily be exemplified by talc, kaolin, zinc oxide, barium sulfate or others.

The present invention may provide talc calcination systems (50) and methods for talc calcination. Calcination may involve providing materials (13) for introduction into a calciner. Materials (13) may include but are not limited to, minerals, talc, low iron talc, combinations thereof, or the like. Minerals may include but are not limited to talc, kaolin, zinc oxide, barium sulfate, pyrophyllite, calcium carbonate, diatomite, mica, any combinations thereof, or the like. Low iron talc may include but is not limited to talc having less than about 1.0% iron by weight; less than about 0.5% iron by weight; between about 0.4% to about 0.01% iron by weight; less than about 0.4% iron by weight; less than about 0.01% iron by weight, or the like. Iron may be $Fe_2O_3$ or other iron compounds. Materials may include an amount of carbonates therein including but not limited to about 10% carbonates by weight; less than about 20% carbonates by weight; less than about 15% carbonates by weight; less than about 10% carbonates by weight; between about 10% and about 15% carbonates by weight; between about 5% and about 10% carbonates by weight, or the like.

Materials (13), such as low iron talc, may be milled to provide a milled composition, or may include coloration prior to being fed into a hopper (8, 9) which may be a pre-blend bin or the like. Milled materials may include but is not limited to a median particle size selected from a group consisting of less than about 7 microns; less than about 3 microns, less than about 1 micron, or the like. In addition, milled materials may have a size up to about 20 microns. In some embodiments, materials or even milled materials may be mixed with at least one metal oxide (14) perhaps with a mixer (10). In other embodiments, materials, such as low iron talc, may not be mixed with at least one metal oxide. Examples of a mixer may include but is not limited to a powder blender, ribbon blender, a pug-mill blender, other blenders commercially available for powder mixing, so as to achieve a violent and thorough blend, prior to introduction into the calciner. or the like. The mixture may be moved to a feed bin perhaps by a conveyor (11) or the like. A feed supply (1) which may include a milled composition of minerals, low iron talc, a combination thereof or the like that may be mixed with at least one metal oxide may be augured or otherwise fed (2) into a calciner (3). A feed input controller (16) may control the rate at which a feed is introduced into a calciner and may even control the rate at which the feed is processed in the calciner. The feed may moves through the calciner (3) for processing perhaps at a specified rate for the feed and product specifications. Gasses (7) that may be given off during calcining may be removed with a gas removal system. A gas removal system may remove gas at a controlled rate. Off-gassing rates may affect a product (4) output quality.

A product may include a composition including but not limited to enstatite; protoenstatite; clino-enstatite; diopside; at least about 25% enstatite; up to about 44% enstatite; at least about 20% of clino-enstatite; up to about 42% of clino-enstatite; between about 12% and about 37% of diopside; any combination thereof, or the like.

In embodiments, the present invention may provide a calciner (3) which may be an indirectly heated, multiple zone calciner, may even be a rotating calciner. Zones of a calciner may include any continuous tract or area that differs in some respect, or is distinguished for some purpose, or may have certain distinctive characteristics. As may be understood from FIG. 1, zones may include a first heat zone (20), a second heat zone (21), and a third heat zone. In some embodiments, a heat zone (25) may be considered a third heat zone, which may be a combination of at least two sub zones, at least three sub heat zones, or the like to create a third heat zone. In other embodiments a heat zone (22) may be considered a third heat zone. At least one additional heat zone may be provided in a calciner perhaps as a fourth zone (23) or a fifth zone (24), in some embodiments. Of course, any number of zones may be provided in a calciner including but not limited to at least two zones, at least three zones, at least four zones, at least five zones, at least six zones, or more or the like and all are meant to be included in the disclosure of this invention. In some embodiments, at least one additional heat zone may have a substantially same temperature as the third heat zone. Alternatively, at least one additional heat zone may have different temperatures. A cooling zone (26) may be provided to cool the product prior to output of the product (4). In embodiments, a cooling zone may cool a product to about 150° C. The temperature of a final cooling zone may be unheated and take the blended temperature of a final heated zone and ambient temperature to bring the temperature of the product to about 150° C. perhaps to enable handling of the product output such as in a product-off-take system.

In embodiments, a calciner (3) may be divided into differentially heated zones, each zone heated indirectly and perhaps even progressively. The zones may be variably heated in that one zone could be heated to a different temperature than another zone or that each zone temperature can be controlled separately perhaps with at least one indirect heat source (6). An indirect heat source may be controlled by a temperature controller (17). In embodiments, each zone may be heated by more than one indirect heat sources (6) as may be understood from FIG. 1. An indirect heat source may be located outside of the calciner. A first heat zone may be considered a $CO_2$ evolution zone where $CO_2$ may evolve from the feed supply. A first heat zone may have a temperature including, but not limited to, between about 500° C. and about 875° C.; between about 550° C. and about 850° C.; between about 575° C. and about 800° C.; about 850° C., or the like. A second heat zone may be considered a $H_2O$ evaluation zone where $H_2O$ may evolve from the feed supply. A second heat zone may have a temperature including, but not limited to, between about 750° C. and about 1000° C.; between about 750° C. and about 1100° C.; between about 775° C. and about 1050° C.; between about 800° C. and about 1000° C.; about 1000° C., or the like. A third heat zone may be considered a hot zone having a temperature including but not limited to, between about 1100° C. and about 1200° C.; between about 1100° C. and about 1125° C.; between about 1100° C. and about 1150° C.; between about 1100° C. and about 1175° C.; between about 1125° C. and about 1150° C.; between about 1125° C. and about 1200° C.; between about 1150° C. and about 1200° C., about 1125° C., about 1150° C., about 1175° C., or the like. In embodiments, a feed supply may be processed in a first zone for an amount of time including but not limited to about 5 minutes; between about 3 and about 10 minutes; between about 5 and about 10 minutes, or the like. A feed supply may be processed in a second zone for an amount of time including but not limited to, about 5 minutes; between about 3 and about 10 minutes; between about 5 and about 10 minutes, or the like. A feed supply may be processed in a third zone for an amount of time including but not limited to about 5 minutes, about 10 minutes, about 15 minutes, about 20 minutes, about 30 minutes, about 40 minutes, about 50 minutes, between about 10 and about 30 minutes; between about 15 minutes and about 18 minutes; between about 18 minutes and about 22 minutes; between about 5 minutes and about 50 minutes, or the like.

When the product is outputted from the calciner, it may have desirable characteristics such as but not limited to color and physical characteristics perhaps for final use in materials such as plastics, paint, paper, and the like.

In embodiments, a calciner tube (15) may include at least one alloy which may allow an increase in temperature of the calciner perhaps beyond that which can be achieved in a traditional iron calcining tube. For example, an alloy may include but is not limited to nickel, chromium, a combination to the two, or the like. Alloys may allow the calciner to achieve up to about 1225° C. inside the calciner. A calciner tube may be a sufficient length to maintain differential temperature zones.

The present invention may provide in embodiments, the use of metal oxides such as metal oxide stains or other stains or the like. Metal oxides, stains, or the like may proactively counteract residual feed or product hue, or the like. Non limiting examples of stains include but are not limited to any stains that can achieve shifting of a* and b* values, Mason 6374; Mason 6376; Mason 6315; Mason 6242; Mason 6206; Mason 6263; Mason 6364; any combination thereof, any stains utilized for shifting the a* and b*value toward negative values; similar compositions and brands, or the like. An amount of stain may vary based on the specific system characteristics. A non-limiting example of amount of stains include, but is not limited to, between about 0.5% and about 0.75% of the total feed by weight; between about 0.25% and about 0.5% of the total feed by weight; between about 0.10% and about 0.25% of the total feed by weight; between about 0.01% and about 0.10% of the total feed by weight, or the like. The feed supply (1) to be calcined may include a stain perhaps to affect a coloration change in the final product. Metal oxides or stains can be added to the feed or may even be added to the output product or both. When, included in the feed supply, the final L*a*b* values of the product output may be influenced. Some products may have L* values between about 95 and about 99.9. The additions may be selected based on a desired effect, can be influenced by the type of feed, the amount of stain blended with the materials, the temperature of calcining, the residence time, or the like. The variance of temperature effectiveness may be about 25° C. more or less. Therefore, specific testing may be required prior to stain selection. The type of particular stain may have particular chemical elements and compounds which may influence the shift of the L* a* and b* values. A particular problem of a paint, plastic, or other producers can be resolved by the addition of particular metal oxides to feed perhaps to counteract such producer's problems with, for example, a particular polypropylene which may have yellowish hues or the like. The amount and type of colorant may be adjusted in the feed perhaps in anticipation of the degree of yellowness expected, perhaps removing a problem in the end product, and even reducing expenses of plastic production.

Figure 2:
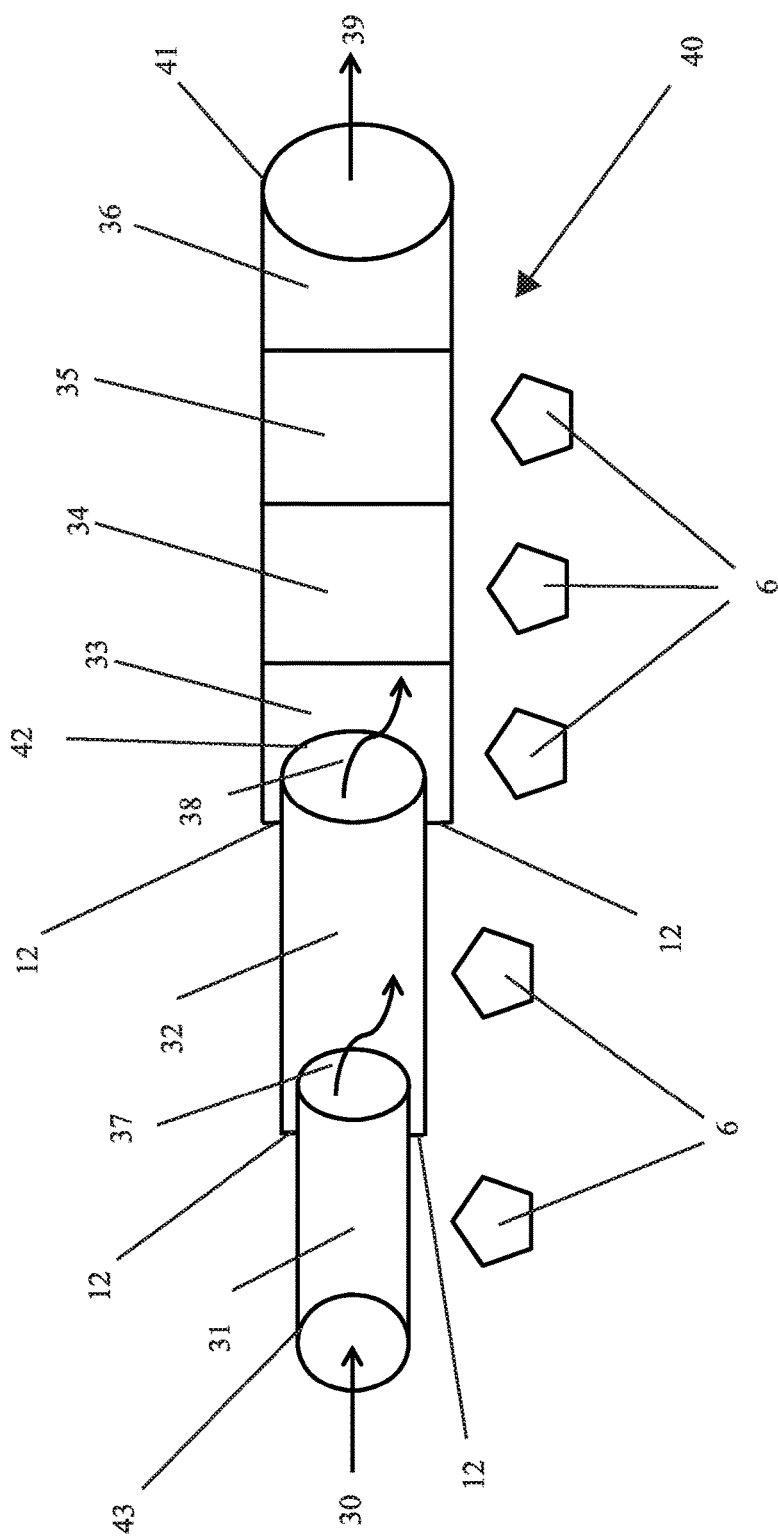
FIG. 2 represents an alternate talc calcination system according to the various embodiments of the present invention which may provide greater control of the temperature in perhaps a first and second zone of a calciner perhaps by reducing heat carry-over from a third zone.

In an alternative embodiment, a calciner (40) may be an isolated calciner as may be understood in FIG. 2. A calciner (40) may be a single connected tube or may even be a multiple-pieced zones perhaps as at least two separate pieces or even three separate pieces (43, 42, and 41) as a non-limiting example. Of course any number of pieces may be used. A calciner may have at least two isolated zones, at least three isolated zones or more or the like. A seal (12) may be used between each zone. Accordingly, as may be understood from FIG. 2, a feed input (30) may be introduced into a first zone (31) of a calciner (40) for processing at a first temperature in the first zone perhaps with heat supplied by a separate heating source (6). Then, the feed may move (37) into a second zone (32) for processing at a second temperature perhaps with heat supplied by a separate heating source (6). Then, the feed may move (38) into a third zone (33) for processing at a second temperature perhaps with heat supplied by at least one separate heating source (6). The third zone may include multiple zones. Alternatively, the feed may be processed in a third zone (33), a fourth zone (34), and perhaps even a fifth zone (35). A product may then be cooled in a cooling zone (36) and may be exited from the calciner as a product output (39).

As mentioned herein, embodiments of the present invention may include a gas removal system (5). A rate of off-gassing, and even residence time, and perhaps calciner tube composition and other parameters may affect color as well. The capacity of the gas removal system may account for the expansion of air entrained in the feed talc. In embodiments, a desired product output may be determined. From this determination a feed requirement and size of the gas removal system may be calculated in order to provide a system that can remove all of the evolved gases from an amount of feed. Therefore, in some embodiments, a feed input controller may be configured to control the rate of feed input to control a rate of off-gassing in said calciner. A rate of feed input into said first heat zone may be designed to match a capacity of the off-gas system to remove all evolved gas. Evolved gases (7) may include but is not limited to carbon dioxide, water vapor, entrained air, any combination thereof, or the like.

Surface area testing clarifies that the stain or colorant is adsorbed onto the lattice or crystal structure of the end product in a sintering process and can help reduce the surface area of the product particles, significantly reducing the oil absorptive capacity of the product. Thus, as a result of embodiments of the present invention, a product may have less surface area perhaps because the crystal may shrink and may result in a reduced oil capacity. In embodiments, the surface area of a product may include but is not limited to about 12 $m^2$/gm; about 4 $m^2$/gm; about 3 $m^2$/gm; about 2 $m^2$/gm; any combination thereof, or the like.

The present invention provides, in embodiments, a combination of parameters which when implemented, may consistently produce a specific product for a specific industry. Specifically, as a non-limiting example, when a process temperature may be within a range of +/−10° C., a feed rate may match the ability of the calciner to remove evolved gases, the colorants are within the desired weight percent range, and perhaps even the mineral feed has nearly the same properties, the resulting product can have L*a*b* values that are substantially identical (e.g., the lamellarity can be similar, and properties such as density, surface area, refractive index can be substantially the same). Thus, the process is repeatable and predictable.

As mentioned herein, a calciner may have various zones that may have different temperatures. In embodiments, the temperature may be raised as the feed supply may move from one zone to another. By raising the calcining temperature in stages, evolved gases may be removed appropriately, perhaps with a time and temperature relationship in each zone, until a final temperature is achieved. Results have shown dramatically different product results when altering individual, single parameters perhaps via each zone. For example, when talc is introduced into a calciner heated to 1100° C., a violent evolution of carbon dioxide, water and entrained air may occur, resulting in the formation of shards from the formerly platy material, cancelling one significant benefit of talc. Likewise, if evolved gases are not removed from the calciner as quickly as evolved, and perhaps if they exert a slight pressure increase, the L*a*b* color values may be negatively impacted. For example, the L* values may be depressed, a* values may have a tendency toward red, and b* values may have a tendency toward yellow. The chromaticity (saturation) may also have a tendency toward lower values. Embodiments of the present invention have also determined that the refractive index of the products could be altered, depending on the specific temperature applied in the process.

As mentioned herein, the present invention provides, in embodiments, indirect heating of a calciner. Indirect heating such as indirect firing may keep combustion gases away from the product and may result in a product which has no hydrocarbon contamination—thus may provide a cleaner product. Indirect heating may reduce product loss up to about 90% or more perhaps due to combustion gas movement to the vent stacks. Indirect heating may reduce energy cost by up to about 30% or more perhaps by keeping the heat contained within the calciner. Indirect heating may not require a ceramic or fire-brick lining and may even allow feed to be in contact with calciner tube alloys which may have a beneficial impact on product quality. Indirect firing may allow use of extremely fine feed powders, even to sub-micron sizes in the system. Indirect firing may not wet or pelletize the feed, perhaps removing the requirement for post-calcining milling and even the resultant product losses and lowering production costs.

In embodiments, it was determined that it may not be necessary to have a ceramic or even fire-brick lined calciner tube, and in fact, the presence or absence of various metals in the calciner tube which came in contact with the feed talc, may have beneficial or even detrimental impacts on the product properties, as compared to the values achieved using ceramic labware and equipment. Specifically the presence of calciner tube alloys containing nickel and chromium appeared beneficial in achieved desirable L*a*b* values. In embodiments, at least one alloy may be present in a calciner tube, including but not limited to nickel; chromium; at least about 11% nickel; up to about 35% nickel; up to about 52% nickel; at least about 18% chromium; up to about 25% chromium; up to about 35% chromium; any combination thereof; or the like. Thus, in specifying alloy materials of the indirect fired calciner, the composition of the desired alloys should be considered in addition to the heating properties normally considered when purchasing a high temperature calciner.

In some embodiments, a feed supply or even a product resulting from a calcination system may be treated perhaps with a product output treatment (18) or the like. For example, a treatment may include but is not limited to a brightness treatment, a hydrophillicity enhancement treatment; a hydrophillicity reduction treatment; a light reflectance enhancement treatment; inorganic surface treatment, organic surface treatment; any combination thereof, or the like. A treatment may include an additive such as but not limited to alumina, zirconia, titanium dioxide, and any combination thereof. Additives may be blended with a product after processing; however some additives may be added to the feed. Alumina, for example, may not be added to the feed because it may melt and evaporate, but finely milled alumina could be blended with the ceramic pigment product in commercially available blenders. Accordingly, a product may accept and hold inorganic or even organic surface treatments and/or additives such as alumina, zirconia, titanium dioxide, or similar treatments, applied according to commonly known methods or procedures.

EXAMPLES

In Table 1, it can be seen that increasing calcining temperatures, up to the melting point of talc, can increase the refractive index, benefitting users of paints and plastics who desire greater hue and saturation. Talc (starting material 600 D) is heated to three different temperatures producing an increased specific gravity, a decreased surface area and BET which decreases significantly between 800° C., 1150° C., and 1225° C.

In Table 2, it can be seen that the specific gravity is increased with increasing temperature, thus allowing a plastics producer to increase his production rate if more pigment product is contained in his extrusion equipment, thus reducing his cost. It may also help reduce transportation costs when a denser product can be hauled in trucks, for example.

Additionally in Table 2, it can be seen that surface area of product crystals decreases due to sintering as the product approaches the melting point in the calciner, when the surface of the crystals becomes flatter, filling in the 'valleys' on the crystal surface. Sintering is a process whereby powders are held to a temperature just below the melting point, allowing the atoms in the powder particles to diffuse across particle boundaries, thus fusing particles or surfaces together. This reduction in surface area is particularly helpful for a paint manufacturer who can then reduce his oil usage cost by using a talc-derived pigment which absorbs less oil.

Table 2 summarizes the effects of high temperature and several different oxide treatments on the CIE L*a*b* values to demonstrate how the process can be controlled to produce desired product results. To compare the values of the newly produced pigments with commercially available titanium dioxide pigments, the L*a*b* values of RD3 titanium dioxide ($TiO_2$) and TRONOX CR-828($TiO_2$) are shown.

Table 3 shows the solar reflectance and thermal emittance of titanium dioxide, and ceramic pigments with titanium dioxide.

TABLE 1

| Product | Surface Area $m^2$ per gram | | Specific Gravity |
|---|---|---|---|
| | Single Point | BET | grams per cc |
| 600D - raw talc | 9.3685 | 9.4867 | 2.8023 |
| At 800° C. | 8.5027 | 8.7497 | 2.8571 |
| At 1150° C. | 6.8631 | 7.0563 | 2.9859 |
| At 1225° C. | 0.5340 | 0.5544 | 3.0490 |

TABLE 2

| Product | L* | a* | b* |
|---|---|---|---|
| 600D-raw talc | 61.72 | −0.14 | 0.48 |
| Test 1 | 99.89 | −0.09 | 2.48 |
| Test 2 | 98.81 | −0.47 | 1.21 |
| Test 3 | 99.73 | −0.09 | 1.60 |
| Test 4 | 99.65 | 0.06 | 1.77 |
| Test 5 | 98.53 | −0.09 | 1.49 |
| Test 6 | 98.73 | −0.41 | 1.27 |
| Test 7 | 99.44 | 0.04 | 1.62 |
| Test 8 | 99.02 | −0.29 | 1.45 |
| RD3 $TiO_2$ | 98.86 | −0.46 | 2.41 |
| TRONOX CR-828 $TiO_2$ | 99.40 | −0.55 | 2.35 |

TABLE 3

| | Solar Reflectance | Thermal Emittance |
|---|---|---|
| Titanium dioxide | 0.85 | 0.91 |
| 25% Ceramic Pigment with $TiO_2$ | 0.84 | 0.92 |
| 50% Ceramic Pigment with $TiO_2$ | 0.83 | 0.91 |

As can be easily understood from the foregoing, the basic concepts of the present invention may be embodied in a variety of ways. It involves both techniques as well as devices to accomplish the predictable change of mineral feed to product possessing physical characteristics which make it commercially useful and feasible as a substitute for more expensive ingredients. In this application, the techniques for calcining, treating mineral feed and coloring are disclosed as part of the results shown to be achieved by the various devices described and as steps which are inherent to utilization. They are simply the natural result of utilizing the devices as intended and described. In addition, while some devices, mineral, metal and colorant types are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "obtaining an appropriate mineral feed" should be understood to encompass disclosure of the act of "obtaining"—whether explicitly discussed or not—and, conversely, were there effectively disclosure of the act of "creating", such a disclosure should be understood to encompass disclosure of a "methods for making" and even a "means for creating" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed the information disclosure statement or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) a method and device for modifying physical components of minerals as well as methods for calcining, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of talc calcination comprising the steps of:
   milling low iron talc to provide a feed supply;
   inputting said feed supply into a multiple zoned calciner comprising a calciner tube having at least one alloy;
   indirect variably heating at least three zones of said multiple zoned calciner resulting in a product;
   processing said feed supply in said at least three zones of said multiple zoned calciner;
   cooling said product; and
   outputting said product.

2. A method of talc calcination according to claim 1 wherein said low iron talc is selected from a group consisting of:
   less than about 1.0% iron by weight;
   less than about 0.5% iron by weight;
   between about 0.4% to about 0.01% iron by weight;
   less than about 0.4% iron by weight; and
   less than about 0.01% iron by weight.

3. A method of talc calcination according to claim 1 wherein said step of processing said feed supply in said at least three zones of said multiple zoned calciner comprises the step of evolving $CO_2$ from said feed supply in a first zone of said multiple zoned calciner.

4. A method of talc calcination according to claim 1 wherein said step of processing said feed supply in said at least three zones of said multiple zoned calciner comprises the step of processing said feed supply in a first zone comprises a temperature selected from a group consisting of between about 500° C. and about 875° C.; between about 550° C. and about 850° C.; between about 575° C. and about 800° C.; and about 850° C.

5. A method of talc calcination according to claim 1 wherein said step of processing said feed supply in said at least three zones of said multiple zoned calciner comprises the step of evolving $H_2O$ from said feed supply in a second zone of said multiple zoned calciner.

6. A method of talc calcination according to claim 1 wherein said step of processing said feed supply in said at least three zones of said multiple zoned calciner comprises the step of processing said feed supply in a second zone comprising a temperature selected from a group consisting of: between about 750° C. and about 1000° C.; between about 750° C. and about 1100° C.; between about 775° C. and about 1050° C.; between about 800° C. and about 1000° C.; and about 1000° C.

7. A method of talc calcination according to claim 1 wherein said step of processing said feed supply in said at least three zones of said multiple zoned calciner comprises the step of processing said feed supply in a third hot zone of said multiple zoned calciner.

8. A method of talc calcination according to claim 7 wherein said step of processing said feed supply in said at least three zones of said multiple zoned calciner comprises the step of heating said feed supply in a third hot to a temperature selected from a group consisting of: between about 1100° C. and about 1200° C.; between about 1100° C. and about 1125° C.; between about 1100° C. and about 1150° C.; between about 1100° C. and about 1175° C.; between about 1125° C. and about 1150° C.; between about 1125° C. and about 1200° C.; and between about 1150° C. and about 1200° C.

9. A method of talc calcination according to claim 7 wherein said third hot zone comprises a temperature selected from a group consisting of about 1125° C., about 1150° C., and about 1175° C.

10. A method of talc calcination according to claim 7 wherein said step of processing said feed supply in said at third hot zone comprises the step of processing said feed supply in said third zone for an amount of time selected from a group consisting of:
    about 5 minutes,
    about 10 minutes,
    about 15 minutes,
    about 20 minutes,
    about 30 minutes,
    about 40 minutes,
    about 50 minutes,
    between about 10 and about 30 minutes;
    between about 15 minutes and about 18 minutes;
    between about 18 minutes and about 22 minutes; and
    between about 5 minutes and about 50 minutes.

11. A method of talc calcination according to claim 1 and further comprising at least one additional heat zone.

12. A method of talc calcination according to claim 11 wherein said at least one additional heat zone comprises a substantially same heat temperature as said third heat zone.

13. A method of talc calcination according to claim 1 wherein said step of cooling said product comprises the step of cooling said product to about 150° C.

14. A method of talc calcination according to claim 1 wherein said step of processing said feed supply in said at least three zones of said multiple zoned calciner comprises the step of controlling a rate of gas removal of evolved gas in said multiple zoned calciner.

15. A method of talc calcination according to claim 14 wherein said evolved gas is selected from a group consisting of carbon dioxide, water vapor, entrained air, and any combination thereof.

16. A method of talc calcination according to claim 1 and further comprising the step of mixing said milled low iron talc with at least one metal oxide stain to provide said feed supply.

17. A method of talc calcination according to claim 16 and further comprising the step of adding an amount of said at least one metal oxide to said minerals based on a desired a* or b* value.

18. A method of talc calcination according to claim 1 wherein said step of indirect variably heating said at least three zones of said multiple zoned calciner comprises the step of separately indirectly heating each of said at least three zones of said calciner.

19. A method of talc calcination according to claim 1 wherein said calciner tube of said calciner comprises at least two separate pieces.

20. A method of talc calcination according to claim 1 wherein said at least one alloy of said calciner tube is selected from a group consisting of nickel; chromium; at least about 11% nickel; up to about 35% nickel; up to about 52% nickel; at least about 18% chromium; up to about 25% chromium; up to about 35% chromium; and any combination thereof.

* * * * *